Patented Sept. 16, 1941

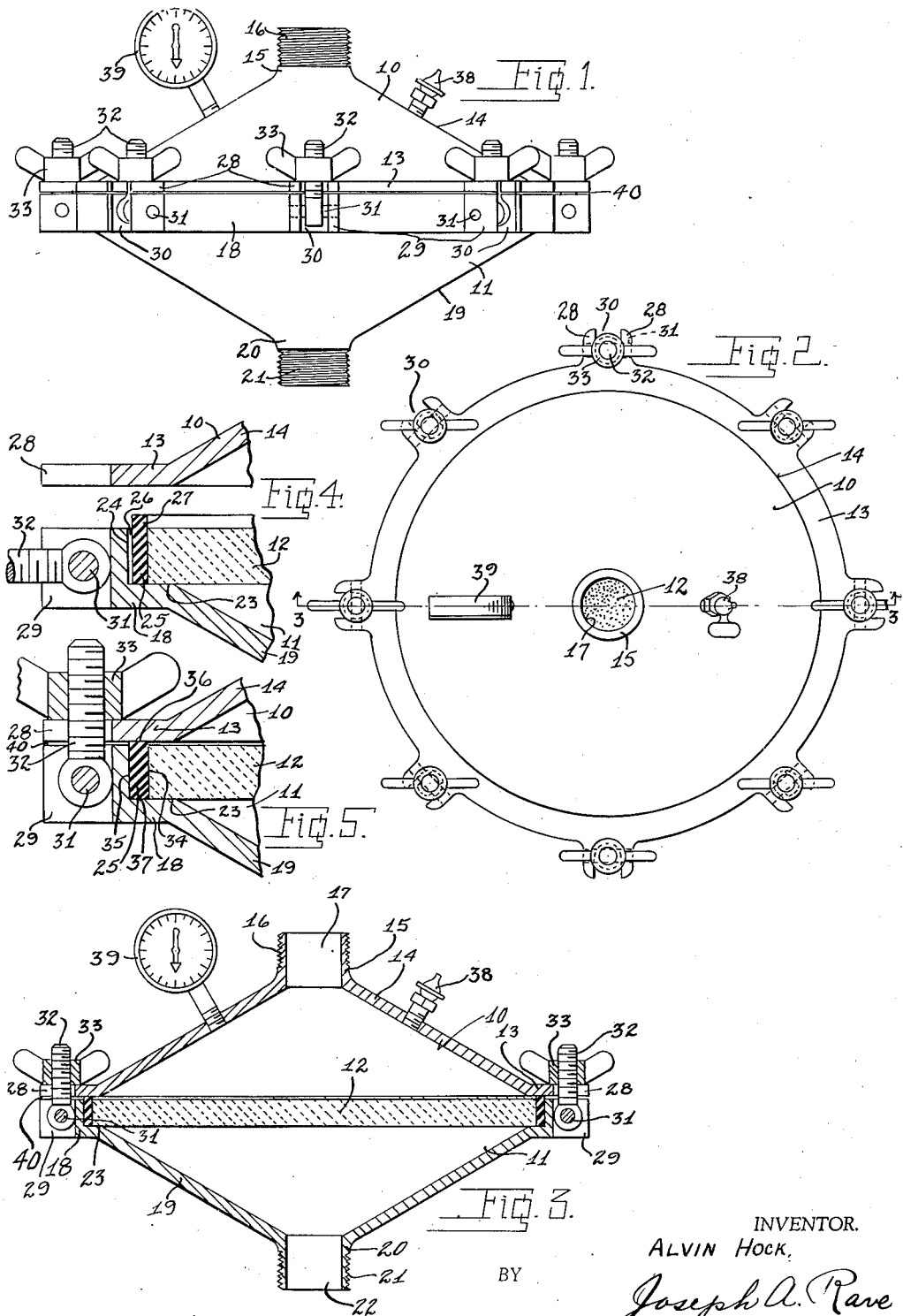
Sept. 16, 1941. A. HOCK 2,256,145
FILTER
Filed Jan. 17, 1938
INVENTOR.
ALVIN HOCK,
BY Joseph A. Rave
ATTORNEY.

2,256,145

UNITED STATES PATENT OFFICE 2,256,145

FILTER

Alvin Hock, Cincinnati, Ohio

Application January 17, 1938, Serial No. 185,301

2 Claims. (Cl. 210—112)

This invention relates to improvements in a filter, and particularly to improvements in means for forming a seal between the several parts which make up the filter.

In the past, various kinds and types of filters have been manufactured and used for removing suspended foreign particles from different fluids. Certain of these filters have employed as the filtering material, natural stone and manufactured filtering stones, generally of refractory material, which, as is known, is quite brittle and will crack or break when subjected to bending stresses and strains. With this type of filtering, considerable difficulty has been experienced in packing the joint between the housing members of the filter, as well as the joint around the filter stone, to avoid stress and strain on the stone, and thereby avoid cracking and breaking thereof. With the construction of a filter of this invention, these difficulties are advantageously overcome, and all joints are suitable and adequately packed.

One of the principal objects of the present invention is, therefore, the provision of a filter for filtering fluids, in which the joints are suitably and adequately sealed without straining any parts of the filter.

Another object of the present invention is the provision of a fluid filter, utilizing manufactured porous stone filtering block, in which this filtering block is suitably secured within a housing to seal the joints therearound without throwing strain on the said block.

Another object of this invention is the provision of a filter utilizing a manufactured artificial porous filtering stone and a housing therefor, in which the joints between the housing and the filtering block and housing are simultaneously closed and sealed without straining the filtering block.

Other objects and advantages of the present invention should be readily apparent by reference to the following specification considered in conjunction with the accompanying drawing forming a part thereof, and it is to be understood that any modifications may be made in the exact structural details there shown and described, within the scope of the appended claims, without departing from or exceeding the spirit of the invention.

In the drawing:

Fig. 1 is an elevational view of the assembled filter of this invention.

Fig. 2 is a horizontal, top plan view of the completed filter, as seen in Fig. 1.

Fig. 3 is a vertical, sectional view, through the assembled filter, taken on line 3—3 of Fig. 2.

Fig. 4 is an enlarged fragmentary view, through the periphery of the filter, showing the parts in relative position just prior to the securing thereof in final position; and, Fig. 5 is a view of the parts of Fig. 4 in finally secured position.

Throughout the several views of the drawing, the same reference characters are employed to denote the same or similar parts.

In general, the filter of the present invention comprises an upper housing member 10, a lower housing member 11 and a filtering member or block 12, illustrated as formed of refractory material, that is, a manufactured porous stone, though it may be a natural stone or similar filtering material.

The upper housing member 10 comprises a radial flange 13, from which upwardly extends the conical or funnel shaped body portion 14, terminating in a boss 15. As shown in the drawing, this boss 15 is provided externally thereof with threads 16 for a suitable hose coupling, pipe coupling, or the like. It will be understood that this boss may be internally threaded, or may be provided with any other type of attaching means whereby a supply pipe or conduit may be connected therewith. The boss 15 is provided centrally thereof with a supply port 17 for communication with the interior of the conical or funnel shaped body portion 14.

The lower housing 11 is likewise provided with a radial flange 18, considerably deeper than the radial flange 13, and from which downwardly extends the conical or funnel shaped housing 19, likewise terminating in a boss 20. The boss 20 is provided externally thereof with threads 21 for a hose, pipe or the like. It will likewise be understood that any other means may be provided on the boss 20 for attaching thereto a pipe or conduit, for conveying the fluids therefrom. The boss 20 is provided centrally thereof with a discharge port 22.

The flange 18, of the lower housing 11, is provided interiorly thereof with a counterbore providing a shoulder or seat 23, on which rests the lower edge of the filtering block 12. As will be seen in the drawing, the filtering block 12 is of a dimension less than the dimension of the counterbore, thereby providing space between the block and the wall 24. This space is eventually filled with a rubber gasket to make a seal therearound. As seen in Fig. 4, the filtering block has therearound a rubber ring 25, of a thickness less than the space between the perimeter of the filtering block and the wall 24, thereby allowing the space 26 between the ring 25 and wall 24. The ring 25 is, however, of a width somewhat in excess of the thickness of the block, providing a portion of the ring 27 which stands upwardly above the block 12. This excess heighth 27 of the ring 25 is eventually forced down into the space between the perimeter of the block 12 and counterbore wall 24, to fill the space 26.

In order to secure the housing members 10 and 11 to one another, and secure the packing ring 25 in position, any suitable means may be provided, preferably, however, such means will be in the nature of quickly releasable members so that the housing members 10 and 11 may be readily separated to permit access to the filtering block for replacement and cleaning purposes. As shown in the drawing, the upper and lower housing flanges 13 and 18 are respectively provided with a plurality of outwardly projecting pairs of arms 28 and 29, thereby providing vertical passageways 30. Pivotally secured between each pair of arms, as at 31, of the lower housing, is an eye bolt 32, adapted to receive a wing nut 33. This type of securing means is well known, and has been used in other fields for a similar purpose.

In operation, the filtering block 12, with its rubber packing ring 25 disposed therearound, is placed on the seat 23 of the lower housing 19, and the upper housing placed thereabove with its flange 13 resting on the upper surface of the packing ring 25. The clamping members 32—33 are then positioned within their respective slots 30, and operated to actuate the housing members toward one another. This results in a generally downward movement of the upper housing 10, causing its flange 13 to force the excess material 27 of the packing ring 25 into the space 26 therearound. This causes the packing ring 25 to completely fill the space between the perimeter of the filtering block 12 and the wall 24 of the counterbore, as illustrated in Fig. 5. The natural tendency of the rubber packing ring 25 to expand and assume its normal position, causes a sealing engagement at 34 between the outer perimeter of the filtering block 12 and the inner wall of the sealing ring 25, as well as a sealing engagement, at 35, between the outer wall of the ring 25 and the wall 24 of the counterbore. There is also a seal established, at 36, between the upper surface of the ring 25 and the under-surface of the top housing flange 13, with a similar seal, at 37, between the bottom surface of the sealing ring 25 and the filtering block seat 23. The parts are so proportioned to one another and to the sealing ring 25 that the said sealing ring is completely compressed before the radial flanges 13 and 18 contact one another and said flanges have really a space between them, as indicated in the drawing by the reference character 40. This, however, throws no strains or clamping pressures of any kind directly on the filtering block 12, and this block is therefore free of any lateral strains which would be the case if a horizontal sealing gasket were used, as for example, between the flanges 13 and 18 under the upper and lower housings, and the top or bottom of the filtering block 12. At the same time, all joints between the parts of the filter are completely closed and sealed to avoid and prevent any flow, seepage or passage therearound.

As further shown in the drawing, the space within the upper housing member 10, and above the filtering block 12, is connected with the atmosphere as by means of a manually operable valve or pet cock 38. The purpose of this valve is to release air within the system at the time of starting the filtering operation, and to release any air that may be introduced into the system after it has been placed in operation.

As will be readily understood, the filtering of foreign matters from liquids as they are passing through the filter, will, in time, cause a clogging of the filter block, necessitating the changing and cleaning thereof. As the said foreign matter builds up, the pressure within the housing 10, and on the filtering block 12, will correspondingly increase, due to the resistance of flow of the liquid through the block. In order to advise the operator of the condition of the filtering block, the upper housing 10 has secured thereto a pressure gauge 39 which will indicate the increase in pressure in the housing 10 and on the filtering block 12 as the foreign matter thereon accumulates. By experience, the operator will know when the filtering block is clogged to the point where it should be replaced and cleaned.

From the foregoing, it is believed now apparent that there has been provided a filter for liquids and the like, which will accomplish the objects initially set forth above, and particularly a filter which can be readily taken apart and cleaned, and in which there is no appreciable lateral strains on the brittle, porous, artificial stone filtering block, and that its life is thereby materially increased.

What is claimed is:

1. In a filter of the class described, the combination of a pair of conical shaped housings, each having a rim coextensive in area, one of said housings having a counterbored recess below its rim an amount substantially equal to the thickness of a stone filter block received therein and said recess terminating in an inwardly extending radial shoulder forming a seat for said stone filter block, a stone filter block within said recess and resting directly on the radial shoulder and having its perimeter spaced substantially inwardly of the wall of the recess, a rubber packing ring around the perimeter of the filter block and between the same and the wall of the recess and normally being of insufficient lateral thickness to fill the space between the filter block perimeter and recess wall, said packing ring being wider than the filter block is thick and having its one end contacting the filter block seat and its other end above the filter block and adapted to be engaged by the rim of the other housing, and means for exerting only an axial movement of said housings relative to one another to squeeze the packing ring therebetween and causing a lateral expansion thereof to fill the space between the filter block perimeter and recess wall and to thereby seal the joints between the housing rims and around the perimeter of the filtering block.

2. In a filter of the class described, the combination of a pair of conical shaped housings, each having a rim coextensive in area, one of said housings having a counterbored recess below its rim an amount substantially equal to the thickness of a stone filter block received therein and said recess terminating in an inwardly extending radial shoulder forming a seat for said stone filter block, a stone filter block within said recess and resting directly on the radial shoulder and having its perimeter spaced substantially inwardly of the wall of the recess, a rubber packing ring around the perimeter of the filter block and between the same and the wall of the recess and normally being of insufficient lateral thickness to fill the space between the filter block perimeter and recess wall, said packing ring being wider than the filter block is thick and having its one end contacting the filter block seat and its other end above the filter block and adapted to be engaged by the rim of the other housing, a plurality of pairs of arms projecting from each housing rim and each pair of arms from one rim overlying a pair of arms from the other rim, an eye bolt pivotly mounted between each pair of arms from one rim and adapted to be swung between the corresponding pair of arms on the other rim, and a thumb nut on each eye bolt above the pairs of arms on the other rim actuable for forcing the housings toward one another to squeeze the packing ring between the filter block seat and other housing rim and cause a lateral expansion of the packing ring to fill the space between the filter block perimeter and recess wall and to thereby seal the joints between the housing rims and around the filter block.

ALVIN HOCK.